(12) United States Patent
Sotokawa et al.

(10) Patent No.: US 7,513,649 B2
(45) Date of Patent: *Apr. 7, 2009

(54) LIGHT SOURCE DEVICE AND DISPLAY DEVICE

(75) Inventors: Akio Sotokawa, Kawasaki (JP); Seiji Hachisuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/808,634

(22) Filed: Jun. 12, 2007

(65) Prior Publication Data

US 2007/0242480 A1 Oct. 18, 2007

Related U.S. Application Data

(60) Division of application No. 11/315,232, filed on Dec. 23, 2005, now Pat. No. 7,290,901, which is a continuation of application No. 10/663,708, filed on Sep. 17, 2003, now Pat. No. 7,070,291, which is a continuation of application No. PCT/JP02/02622, filed on Mar. 19, 2002.

(30) Foreign Application Priority Data

Mar. 19, 2001 (JP) ............................. 2001-078546

(51) Int. Cl.
 *F21V 29/00* (2006.01)
(52) U.S. Cl. .................. 362/263; 362/264; 362/218; 362/294

(58) Field of Classification Search ................. 362/263, 362/264, 218, 561, 294, 217
See application file for complete search history.

(56) References Cited

U.S. PATENT DOCUMENTS

| 2,425,599 | A | * | 8/1947 | Cox | 313/22 |
| 2,966,602 | A | * | 12/1960 | Waymouth et al. | 313/44 |
| 3,309,565 | A | * | 3/1967 | Clark et al. | 315/117 |
| 3,379,868 | A | | 4/1968 | Taillon | |
| 3,636,341 | A | | 1/1972 | Miller | |

(Continued)

FOREIGN PATENT DOCUMENTS

EP 0 276 888 A2 8/1988

(Continued)

OTHER PUBLICATIONS

European Search Report dated Mar. 15, 2007, issued in corresponding European Application No. 02 70 5359.

*Primary Examiner*—Laura Tso
(74) *Attorney, Agent, or Firm*—Westerman, Hattori, Daniels & Adrian, LLP.

(57) ABSTRACT

A light source device includes a discharge tube, a reflector for reflecting a light radiated from the discharge tube, and support members for supporting the discharge tube to the reflector. The support member or the discharge tube is formed of a heat insulating structure so as to prevent a temperature drop of a portion of the discharge tube near electrodes thereof. By this arrangement, it is possible to prolong the operational life of the discharge tube.

11 Claims, 6 Drawing Sheets

U.S. PATENT DOCUMENTS

| | | | |
|---|---|---|---|
| 3,917,971 A | | 11/1975 | Muzeroll |
| 3,965,345 A | * | 6/1976 | Fordsmand ................ 362/218 |
| 4,866,327 A | | 9/1989 | Fischer et al. |
| 4,914,553 A | | 4/1990 | Hamada et al. |
| 4,924,368 A | | 5/1990 | Nothrop et al. |
| 5,161,884 A | * | 11/1992 | Siminovitch ............... 362/294 |
| 5,291,379 A | | 3/1994 | Lu |
| 5,697,696 A | * | 12/1997 | Kuroda et al. ............. 362/218 |
| 6,147,724 A | | 11/2000 | Yoshii et al. |
| 6,254,244 B1 | | 7/2001 | Ukai et al. |
| 7,070,291 B2 | | 7/2006 | Sotokawa et al. |
| 2002/0113534 A1 | | 8/2002 | Hayashi et al. |

FOREIGN PATENT DOCUMENTS

| | | |
|---|---|---|
| EP | 0 389 280 A1 | 9/1990 |
| JP | 4-67626 U | 6/1992 |
| JP | 7-288019 | 10/1995 |
| JP | 07-325302 A | 12/1995 |
| JP | 8-55608 | 2/1996 |
| JP | 10-106315 A | 4/1998 |
| JP | 10-333149 A | 12/1998 |
| JP | 11-84381 | 3/1999 |
| JP | 11-149815 A | 6/1999 |
| JP | 11-295734 A | 10/1999 |
| JP | 2000-123788 | 4/2000 |
| JP | 2000-173542 A | 6/2000 |
| JP | 2000-214461 A | 8/2000 |

* cited by examiner

LIGHT SOURCE DEVICE AND DISPLAY DEVICE

This application is divisional of application Ser. No. 11/315,232, filed Dec. 23, 2005, which is a continuation of application Ser. No. 10/663,708, filed on Sep. 17, 2003, now U.S. Pat. No. 7,070,291, which is a continuation of PCT/JP 02/02622 filed Mar. 19, 2002, which claims the priority of Japanese Application No. 2001-078546 filed Mar. 19, 2001, which is incorporated herein by reference.

TECHNICAL FIELD

The present invention relates to a light source device having a discharge tube emitting light by a discharge in a lean gas.

BACKGROUND ART

A backlight, as a light source device of a display device such as a liquid crystal display device, uses a light source device comprising one or a plurality of discharge tubes and a reflector. The discharge tube is a cold cathode tube, in which mercury is contained in a lean gas (such as Ar and Ne) and a fluorescent material is coated on the tube wall. Electrodes are provided in both ends of the discharge tube. The discharge tube is supported by the reflector with support members which are arranged at positions near the electrodes of the discharge tube. The backlight also has a light guide plate, and the light source device is arranged on the side of the light guide plate.

When the high voltage is applied to the electrodes of the discharge tube, electrons are emitted by the electrodes and impinge against the mercury gas in the discharge tube. The mercury gas produces ultraviolet light, which impinges against the fluorescent material in the discharge tube to emit visible light. As the amount of the mercury gas in the discharge tube is reduced, the amount of emitted light is reduced and an operational life thereof ends. Usually, a sufficient amount of mercury gas is sealed in the discharge tube to enable the discharge tube to have a long life, but there are discharge tubes having extremely short operational lives.

SUMMARY OF THE INVENTION

The object of the present invention is to provide a light source device capable of a long operational life of a discharge tube.

A light source device, according to the first aspect of the present invention, comprises a discharge tube, a reflector for reflecting a light radiated from the discharge tube, and support members for supporting the discharge tube to the reflector, said support members being formed of a heat insulating structure so as to prevent a temperature drop of a portion of the discharge tube near electrodes of the discharge tube.

A light source device, according to the second aspect of the present invention, comprises a discharge tube, a reflector for reflecting a light radiated from the discharge tube, and support members for supporting the discharge tube to the reflector, the discharge tube being formed of a partially heat insulating structure so as to prevent a temperature drop of a portion of the discharge tube near electrodes of the discharge tube.

A light source device, according to the third aspect of the present invention, comprises a discharge tube, a reflector for reflecting a light radiated from the discharge tube, and support members for supporting the discharge tube to the reflector, the support members being arranged at positions inward from ends of electrodes of the discharge tube so as to prevent a temperature drop of a portion of the discharge tube near electrodes of the discharge tube.

A light source device, according to the fourth aspect of the present invention, comprises a discharge tube, a reflector for reflecting a light radiated from the discharge tube, support members for supporting the discharge tube to the reflector, and a heat conduction member contacting a central portion of the discharge tube.

In these arrangements, generally, the operating life of the discharge tube will end if the mercury contained in the discharge tube is consumed. Consumption of mercury occurs in such a manner that gaseous mercury in the discharge tube reacts with particles of metal of the electrodes (for example, Ni) caused by sputtering with electrons and is adhered to and captured by the inner surface of the discharge tube. A sufficiently large amount of mercury is usually inserted in the discharge tube, it takes much time for mercury to be consumed and, therefore, the operating life of the discharge tube is guaranteed to some extent.

However, there are several discharge tubes among many discharge tubes which have extremely short operating life. According to the inventor's study, the extremely short operating life is caused by the following reason. That is, a portion of the discharge tube near the electrodes is primarily a portion at which the largest amount of heat is generated and the temperature is higher, but in the structure in which the discharge tube is supported to the reflector by the support members, heat of the discharge tube is thermally conducted to the reflector through the support members and further from the reflector to the housing of the display device, so that the temperature of the portion of the discharge tube near the electrodes becomes the lowest within the discharge tube. Also, the support members are arranged at positions near the electrodes of the discharge tube, the reflector is generally made of metal, and the support members are made of silicone so as to withstand the high voltage applied to the electrodes. Therefore, heat of the discharge tube is liable to be conducted to the reflector through the support members.

Mercury exists in the discharge tube in a gaseous state as well as in a non-gaseous state (liquid or solid). The liquid mercury is collected at the lowest temperature point in the discharge tube (because a concentration gradient is produced because of a difference in a saturated vapor pressure due to a temperature difference, mercury is conveyed by diffusion). Particles of metal of the electrodes caused by sputtering with electrons are deposited on the thus collected liquid mercury, and produces a thin membrane on the liquid mercury. This membrane prevents the mercury from evaporating, and the amount of the gaseous mercury in the discharge tube is reduced. If the amount of the gaseous mercury is reduced, the discharge tube becomes dark and the operating life thereof is short.

Accordingly, in the present invention, a shortened operational life of the discharge tube is prevented by adopting the above-described arrangements so that the portion of the discharge tube near the electrodes of the discharge tube does not become the lowest temperature point and so that the liquid mercury is not captured and enclosed by the particles of metal of the sputtered electrodes, whereby the amount of the gaseous mercury is not reduced.

The above-described light source device can be used as a light source device of an information processing apparatus and a display device.

Further, the present invention provides an information processing apparatus comprising a light source device and a light valve receiving a light emitted by the light source device, the light source device including a discharge tube, a reflector for reflecting a light radiated from the discharge tube, support members for supporting the discharge tube to the reflector, and a layer of heat insulating material arranged between the discharge tube and the support member or between the support member and the reflector.

Further, the present invention provides a display device comprising a light source device and a light valve receiving a light illuminated by the light source device, the light source device including a discharge tube, a reflector for reflecting a light radiated from the discharge tube, support members for supporting the discharge tube to the reflector, and a layer of heat insulating material arranged between the discharge tube and the support member or between the support member and the reflector.

Further, the present invention provides a light source device comprising a discharge tube, a reflector for reflecting a light radiated from the discharge tube, and support members for supporting the discharge tube to the reflector, the reflector being made of a resin.

BEST MODE FOR CARRYING OUT THE INVENTION

Figure 1:
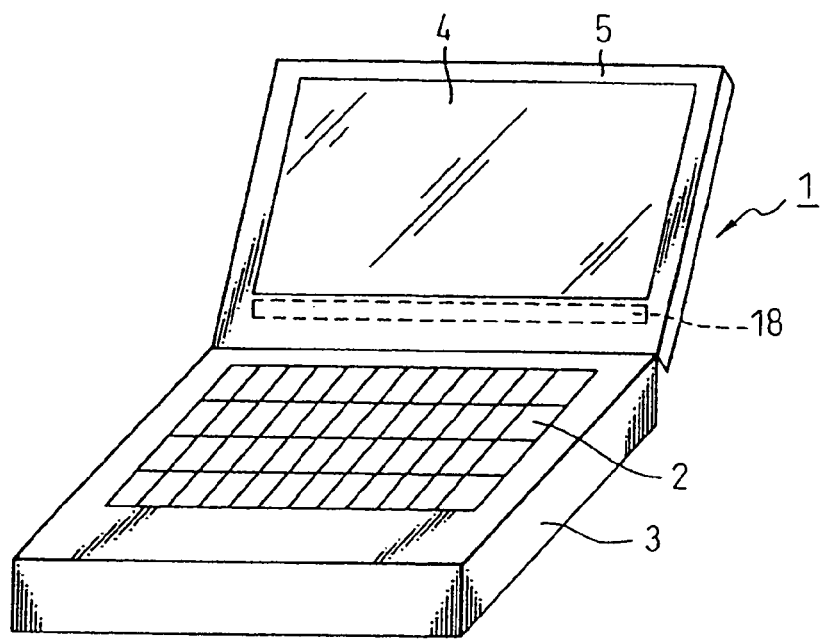
FIG. 1 is a view showing the notebook type personal computer including the light source device according to the present invention.

Embodiments of the present invention will be explained hereinafter with reference to the accompanying drawings. FIG. 1 is a view showing the notebook type personal computer including the light source device according to the embodiment of the present invention, and FIG. 2 is a view showing the display device including the light source device according to the present invention.

In FIG. 1, the notebook type personal computer 1 comprises a body 3 having a keyboard 2 and electronic circuits, and a display part 5 having a display 4 such as a liquid crystal display device. The display part 5 has a light source device 18. The notebook type personal computer 1 of FIG. 1 includes one light source device 18, but it is possible to arrange two light source devices 18, as in the case of the display device 6 of FIG. 2.

Figure 2:
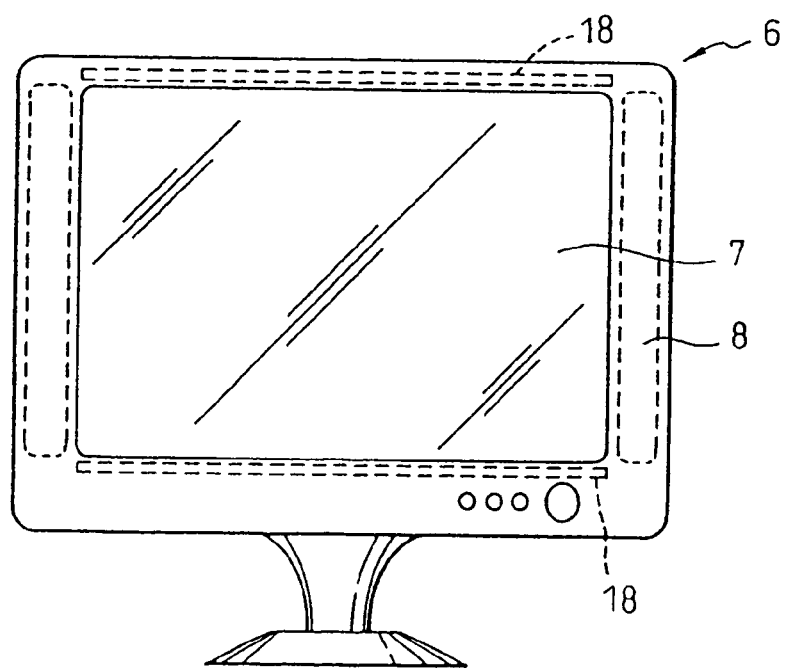
FIG. 2 is a view showing the display device including the light source device of the present invention.

In FIG. 2, the display device 6 comprises a body 8 having a display 7 such as a liquid crystal display device and electronic circuits. The body 8 has light source devices 18. The display device 6 of FIG. 2 includes two light source devices 18, but it is possible to arrange one light source device 18, as in the case of the notebook type personal computer 1 of FIG. 1.

Figure 3:
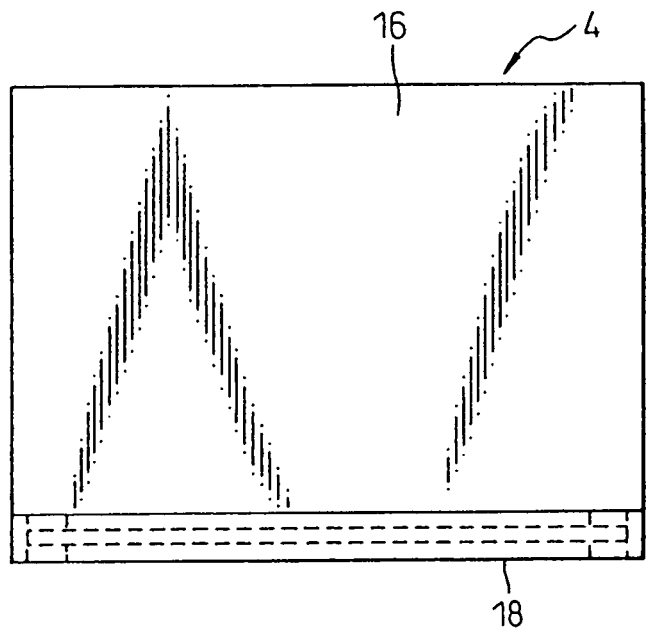
FIG. 3 is a plan view of the light guide plate and the light source device of the display device of FIG. 1.
Figure 4:
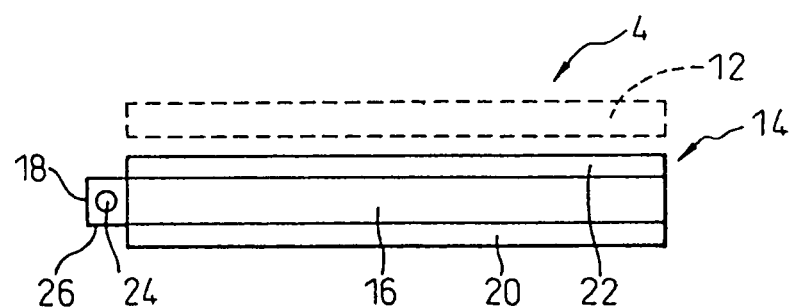
FIG. 4 is a sectional view of the light guide plate and the light source device of FIG. 3.

FIG. 3 is a plan view of the light guide plate and the light source device of the display 4 of FIG. 1, and FIG. 4 is a sectional view of the light guide plate and the light source device of FIG. 3. In FIGS. 3 and 4, the display 4 includes a liquid crystal display panel 12 and a backlight 14. The backlight 14 includes a light guide plate 16, the light source devices 18 arranged at the side of the light guide plate 16, a scattering reflection plate 20 arranged below the light guide plate 16, and a scattering plate 22 arranged above the light guide plate 16.

The light source device 18 comprises a discharge tube 24 and a reflector 26. A part of the light emitted by the discharge tube 24 is made directly incident to the light guide plate 16, and another part of the light outgoing from the discharge tube 24 is reflected by the reflector 26 to be made incident to the light guide plate 16. The light travels within the light guide plate 16, is reflected by the scattering reflection plate 20 to leave the light guide plate 16 toward the liquid crystal display panel 12, and is made incident to the liquid crystal display panel 12 after being scattered by the scattering plate 22. The liquid crystal display panel 12 forms an image, and the light supplied from the light source device 18 illuminates the image formed by the liquid crystal display panel 12, so that a viewer can see a bright image.

Figure 5:
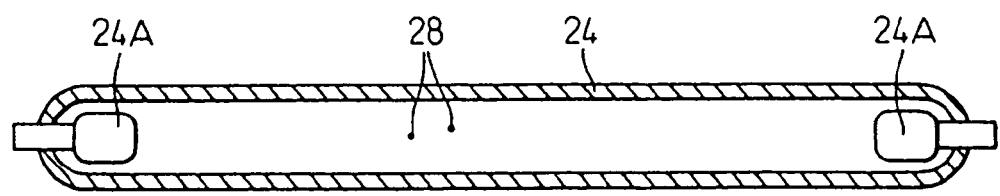
FIG. 5 is a sectional view showing the discharge tube.
Figure 6:
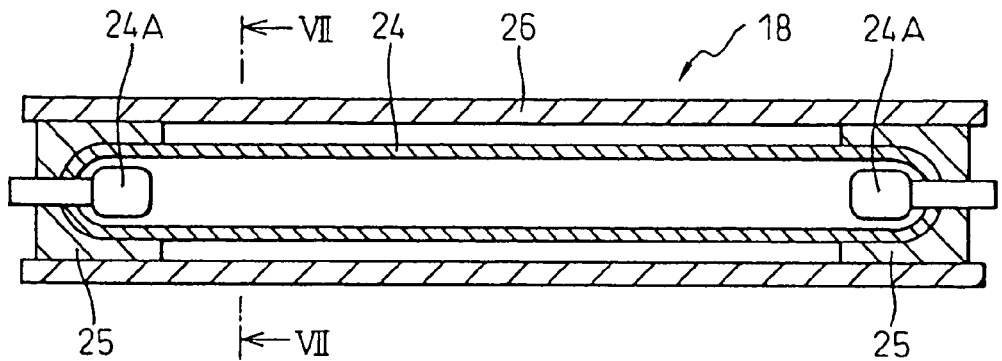
FIG. 6 is a sectional view of the light source device including the discharge tube and the reflector.
Figure 7:
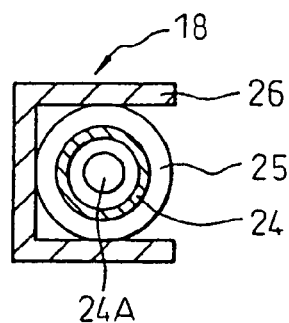
FIG. 7 is a sectional view of the light source device, taken along the line VII-VII in FIG. 6.

FIG. 5 is a sectional view showing the discharge tube 24, and FIG. 6 is a sectional view showing the light source device 18 including the discharge tube 24 and the reflector 26. FIG. 7 is a sectional view of the light source device 18, taken along the line VII-VII in FIG. 6. The discharge tube 24 comprises a cold-cathode tube called a fluorescent lamp. Electrodes 24A made of metal such as Ni or W are arranged in the ends of the discharge tube 24. Lean gas (such as Ar or Ne) and mercury 28 are inserted and sealed in the discharge tube 24, and a fluorescent material is coated on the inner surface of the discharge tube 24. The reflector 26 comprises an aluminum mirror, for example, and has a cross-sectional shape such a U-shape to cover the discharge tube 24.

Support members 25 are arranged on the discharge tube 24 near the electrodes 24A for supporting the discharge tube 24 to the reflector 26. The inner surface of the support member 25 is in close contact with the discharge tube 24, and the outer surface of the support member 25 is in close contact with the reflector 26. A portion of the electrode 24A is within the discharge tube 24, and another portion of the electrode 24A extends to the exterior of the discharge tube 24 through the end of the discharge tube 24 and the end of the support member 25.

The support member 25 is formed of a heat insulating structure so as to prevent a temperature drop of a portion of the discharge tube 24 near the electrode 24A. In this embodiment, the support member 25 is made of a material having high heat insulating property and high voltage withstanding property. For example, the support member 25 is made of Aramid fiber. The support member 25 can be made of glass wool.

In the structure in which the discharge tube 24 is supported by the reflector 26 with the support members 25, there is a tendency that heat of the discharge tube 24 is thermally conducted to the reflector 26 through the support members 25, and further from the reflector 26 to the housing of the display device, so that the temperature of a portion of the discharge tube 24 near the electrodes 24A may be reduced.

Conventional support members are made of silicone so as to withstand the high voltage applied to the electrodes, and the heat of the discharge tube 24 is thermally conducted to the reflector 26 through the support members 25, because silicone has a good heat conductivity, so that the temperature of the portion of the discharge tube 24 near the electrodes 24A may be possibly reduced to the lowest value. Therefore, liquid mercury is collected at the portion of the discharge tube 24 near the electrodes 24A where the temperature is lowest, resulting in the reduction of the amount of gaseous mercury and a short life of the discharge tube 24.

In the present invention, the support member 25 is formed of a highly heat insulating material, so the heat of the discharge tube 24 is not so mush thermally-conducted to the reflector 26 through the support members 25, and the temperature of the portion of the discharge tube 24 near the electrodes 24A is not reduced to the lowest value. The portion of the discharge tube 24 near the electrodes 24A is a portion at which the amount of the generated heat is primarily maximum and the temperature is higher, and the position at which the temperature becomes lowest in the discharge tube 24 is shifted toward the center from the region in which the support member 25 extends. Therefore, liquid mercury is not collected at the portion of the discharge tube 24 near the electrodes 24A.

On the other hand, metal of the electrodes 24A of the discharge tube 24 is sputtered with electrons during discharge and particles of metal of the electrodes 24A are deposited on the inner surface of the discharge tube 24. The region in which particles of metal of the electrodes 24A are deposited on the inner surface of the discharge tube 24 is limited to the region within a restricted distance from the end of the electrode 24A. For example, in the case of the discharge tube 24 having the diameter of 5 mm, the region in which particles of metal of the electrodes 24A are deposited on the inner surface of the discharge tube 24 is within approximately 10 mm from the end of the discharge tube 24 or within 5 mm from the end of the electrode 24A.

Liquid mercury is not collected in the region in which particles of metal of the electrodes 24A are deposited, so liquid mercury is not captured by particles of metal. Therefore, according to the present invention, most liquid mercury can continue to evaporate and the amount of gaseous mercury is not reduced, so the operating life of the discharge tube 24 is not shortened.

Figure 8:
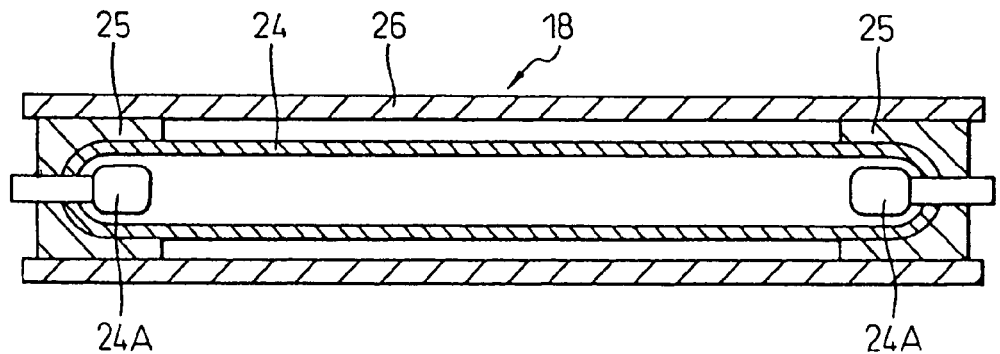
FIG. 8 is a sectional view of the light source device including the discharge tube and the reflector according to another example.
Figure 9:
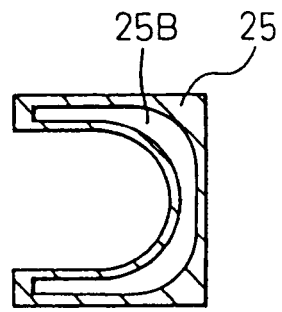
FIG. 9 is a sectional view of the support member of FIG. 8.

FIG. 8 is a sectional view of the light source device 18 including the discharge tube 24 and the reflector 26 according to a modified embodiment, and FIG. 9 is a sectional view of the support member of FIG. 8. Support members 25 are arranged on the discharge tube 24 near the electrodes 24A for supporting the discharge tube 24 to the reflector 26. The support member 25 is formed of a heat insulating structure so as to prevent a temperature drop of a portion of the discharge tube 24 near the electrode 24A. In this embodiment, the support member 25 is made of silicone, similar to a conventional support member, but the support member 25 has a hollow portion 25B to realize a heat insulating structure. The operation of this embodiment is similar to that of the previous embodiment.

Figure 10:
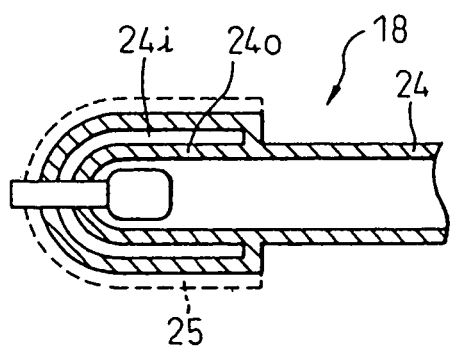
FIG. 10 is a sectional view of the light source device including the discharge tube and the reflector according to a further example.

FIG. 10 is a sectional view of the light source device 18 including the discharge tube 24 and the reflector 26 (reflector 26 is omitted in FIG. 10) according to a modified embodiment. In this embodiment, the discharge tube 24 is partially formed of a heat insulating structure so as to prevent a temperature drop of a portion of the discharge tube 24 near the electrode 24A of the discharge tube 24. In other words, the end portion of the discharge tube 24 is formed in a double-tube structure having an outer tube portion 24o and an inner tube portion 24i, so that a heat insulation part comprising an air layer or a vacuum layer is provided between the outer tube portion 24o and the inner tube portion 24i. The support member 25 is arranged around the outer tube portion 24o and supports the discharge tube 24 to the reflector 26. The operation of this embodiment is similar to that of the previous embodiment.

Figure 11:
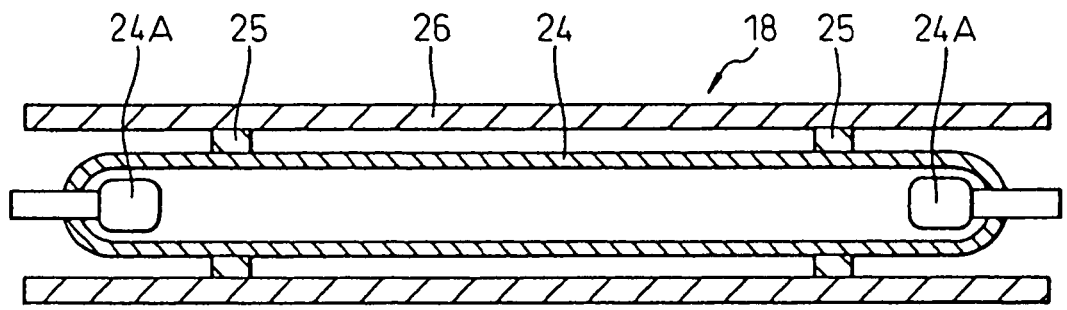
FIG. 11 is a sectional view of the light source device including the discharge tube and the reflector according to a further example.

FIG. 11 is a sectional view of the light source device 18 including the discharge tube 24 and the reflector 26 according to a modified embodiment. In this embodiment, the support members 25 are arranged at positions inward from the ends of electrodes 24A of the discharge tube 24 so as to prevent a temperature drop of a portion of the discharge tube 24 near the electrode 24A of the discharge tube 24. As described above, the region in which particles of metal of the electrodes 24A are deposited on the inner surface of the discharge tube 24 is limited to the region within a restricted distance from the end of the electrode 24A. The support members 25 are arranged on the outside of the regions in which particles of metal of the electrodes 24A are deposited (i.e., inward positions).

In this case, the support members 25 are not necessarily made of a heat insulating material, and are made of silicone, for example. Therefore, the temperature is lowest at the portion of the discharge tube 24 where the support members 25 are located due to the thermal conduction through the support members 25, as described above. However, as the lowest temperature portion of the discharge tube 24 is out of the region in which particles of metal of the electrodes 24A are deposited on the inner surface of the discharge tube 24, so liquid mercury is not captured by particles of metal. Therefore, according to the present invention, most liquid mercury can continue to evaporate and the amount of gaseous mercury is not reduced, so the operating life of the discharge tube 24 is not shortened.

Figure 12:
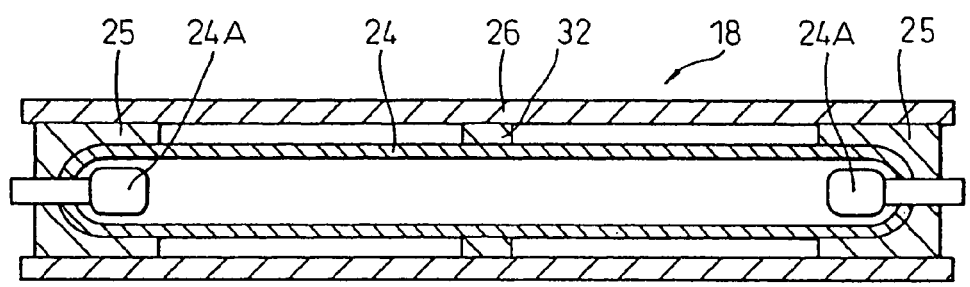
FIG. 12 is a sectional view of the light source device including the discharge tube and the reflector according to a further example.

FIG. 12 is a sectional view of the light source device 18 including the discharge tube 24 and the reflector 26 according to a modified embodiment. In this embodiment, the light source device 18 comprises support members 25 arranged at positions near electrodes 24A of the discharge tube 24 for supporting the discharge tube 24 to the reflector 26, and a heat conduction member 32 contacting a central portion of the discharge tube 24. The support members 25 are made of silicone. The heat conduction member 32 is made of silicone having higher heat radiating property. Alternatively, it is possible to arrange fins on the heat conduction member 32 or to deliver cooling air from a fan.

The heat conduction member 32 also contacts the reflector 26 and releases the heat of the central portion of the discharge tube 24 to the reflector 26 to move the lowest temperature portion to the central portion of the discharge tube 24. Therefore, liquid mercury is not collected to a portion of the discharge tube 24 near the electrodes 24A, and liquid mercury is not captured by particles of metal. Therefore, according to the present invention, most liquid mercury can continue to evaporate and the amount of gaseous mercury is not reduced, so the operating life of the discharge tube 24 is not shortened.

Also, by moving the lowest temperature point to the center of the discharge tube 24, mercury 28 evaporates mainly at the lower temperature portion and resultant gaseous mercury diffuses in the whole discharge tube 24. The diffused gaseous mercury also returns to the lower temperature portion. In this way, gaseous mercury is uniformly distributed in the whole discharge tube 24, and the temperature and the pressure of gaseous mercury are substantially uniform in the whole discharge tube 24. That is, it is possible to control the temperature of gaseous mercury, by making the lower temperature point. The brightness of light emitted by the discharge tube 24 becomes maximum at the optimum concentration of gaseous mercury, and the corresponding temperature, in the discharge tube 24, and the brightness of the light emitted by the discharge tube 24 is lower than the maximum value if the concentration of gaseous mercury is higher or lower than the optimum concentration or if the temperature in the discharge tube 24 is higher or lower than the optimum value. In this embodiment, it is possible to acquire the maximum brightness of the light emitted by the discharge tube 24, by moving the lower temperature point in the discharge tube 24 to thereby set the temperature in the discharge tube 24 at or near the optimum value.

Figure 13:
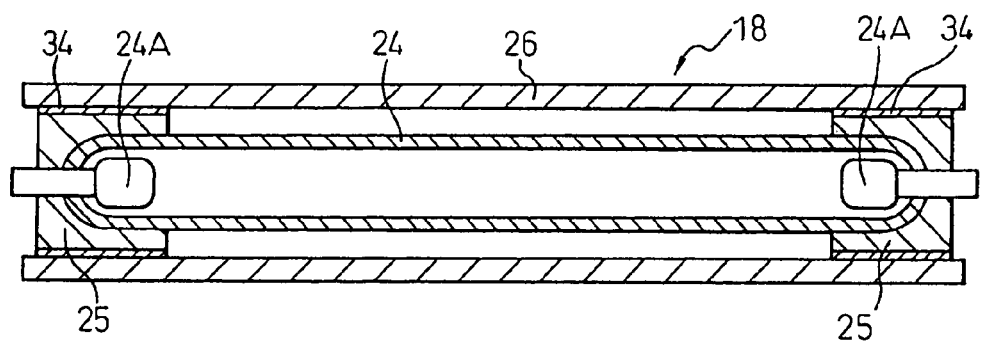
FIG. 13 is a sectional view of the light source device including the discharge tube and the reflector according to a further example.

FIG. 13 is a sectional view of the light source device 18 including the discharge tube 24 and the reflector 26 according to a modified embodiment. Support members 25 are arranged at positions near the electrodes 24A of the discharge tube 24 for supporting the discharge tube 24 to the reflector 26. A layer of heat insulating material (heat insulating sheet) 34 is arranged between the discharge tube 24 and the reflector 26. The discharge tube 24 is attached to the reflector 26, with the layer of heat insulating material 34 bonded to the support member 25. The support member 25 is made of silicone as in the conventional case, and the layer of heat insulating material 34 is made of meta-type Aramid fiber (Cornex from Teijin Corporation, for example). The support member 25 has a good heat conducting property, but the layer of heat insulating material 34 blocks the heat to thereby prevent the heat from escaping from the ends of the discharge tube 24 to the reflector 26. Therefore, a temperature drop of a portion of the discharge tube 24 near the electrodes 24A is prevented. The operation of this embodiment is identical to that of the previous embodiments.

Figure 14:
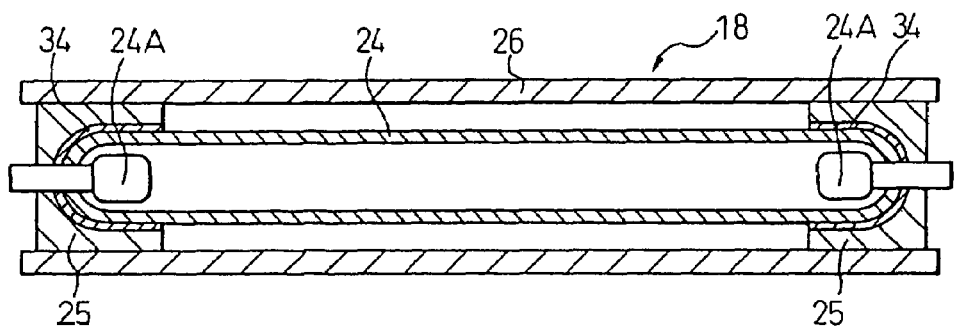
FIG. 14 is a sectional view of the light source device including the discharge tube and the reflector according to a further example.

FIG. 14 is a sectional view of the light source device 18 including the discharge tube 24 and the reflector 26 according to a modified embodiment. Support members 25 are arranged at positions near the electrodes 24A of the discharge tube 24 for supporting the discharge tube 24 to the reflector 26. A layer of heat insulating material (heat insulating sheet) 34 is arranged between the discharge tube 24 and the support member 25. The support member 25 is made of silicone as in the conventional case, and the layer of heat insulating material 34 is made of meta-type Aramid fiber (Cornex from Teijin Corporation, for example). The support member 25 has a good heat conducting property, but the layer of heat insulating material 34 blocks the heat to thereby prevent the heat from escaping from the ends of the discharge tube 24 to the reflector 26. Therefore, a temperature drop of a portion of the discharge tube 24 near the electrodes 24A is prevented. The operation of this embodiment is identical to that of the previous embodiments.

Figure 15:
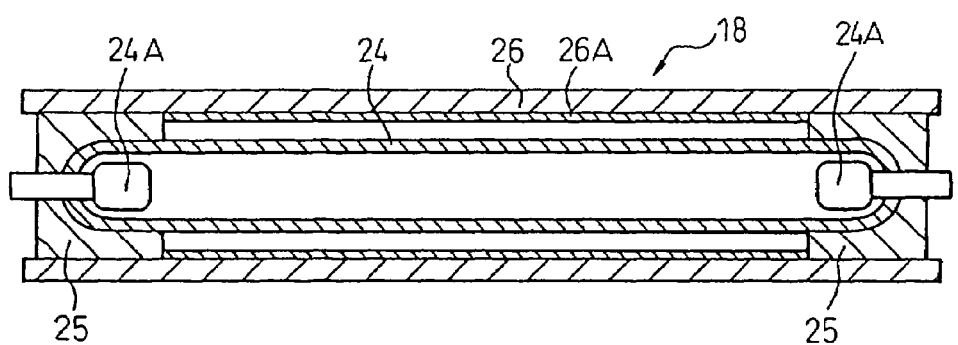
FIG. 15 is a sectional view of the light source device including the discharge tube and the reflector according to a further example.

FIG. 15 is a sectional view of the light source device 18 including the discharge tube 24 and the reflector 26 according to a modified embodiment. In this embodiment, the reflector 26 is made of a heat insulating resin, for example, polycarbonate. Polycarbonate is a polyester resin of carbonic and polyhydric alcohol. Polycarbonate using aromatic alcohol has properties such as a higher melting point (superior to thermal stability), a higher mechanical strength, and a higher electric insulation. A reflection layer 26A such as aluminum is coated on the inner surface of the reflector 26 so that it does not overlap with the support members 25. Therefore, the support member 25 has a good heat conducting property, but the reflector 26 blocks the heat to thereby prevent the heat from escaping from the ends of the discharge tube 24 to the reflector 26 through the support members 25. Therefore, a temperature drop of a portion of the discharge tube 24 near the electrodes 24A is prevented. The operation of this embodiment is identical to that of the previous embodiments.

INDUSTRIAL APPLICABILITY

As explained above, according to the present invention, it is possible to provide a light source device having a discharge tube having a long operating life.

What is claimed is:

1. A light source device comprising:
   a discharge tube having at least one electrode;
   a reflector;
   a plurality of support members in contact with said discharge tube, and
   wherein said support members are positioned so as to maintain a lower temperature at a portion of said discharge tube between said support members than a temperature of a portion of the discharge tube located near said at least one electrode;
   at least one support member of said plurality of support members supports said discharge tube to said reflector; and,
   wherein said at least one support member of said plurality of support members is located inward from an end of said discharge tube comprising said at least one electrode so as to prevent a temperature drop of a portion of the discharge tube near said electrode.

2. The light source device of claim 1, wherein a heat conduction member is located in contact with said discharge tube at a portion of the discharge tube near said at least one electrode so as to prevent said portion from being the lowest point in temperature.

3. The light source device of claim 1, wherein the temperature of said discharge tube is lowest at a portion of the discharge tube where said at least one support member is located.

4. The light source device of claim 1, wherein the temperature of said discharge tube is higher near said electrode and lower toward the center of said discharge tube.

5. The light source device of claim 1, wherein the support member contacts only a minority of a length of the discharge tube.

6. The light source device of claim 1, wherein said support member is a ring surrounding a half circumference or more of the discharge tube.

7. The light source device of claim 1, wherein said light source device is located in any one of the group consisting of: a LCD module, a LCD display, a table top computer and a notebook computer.

8. A display module including a light source device, said display unit comprising the light source device as set forth in claim 1.

9. A display device mounting a light source for displaying, said display device comprising the light source device as set forth in claim 1.

10. An information handling apparatus comprising a display module including the light source device as set forth in claim 1.

11. A portable information handling apparatus comprising a display module including the light source device as set forth in claim 1.

* * * * *